United States Patent
Namineni et al.

(10) Patent No.: US 10,514,465 B2
(45) Date of Patent: Dec. 24, 2019

(54) UPDATING VEHICLE CLOCK

(71) Applicant: GM Global Technology Operations LLC, Detroit, MI (US)

(72) Inventors: Pavan K. Namineni, Ann Arbor, MI (US); Donald K. Grimm, Utica, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 291 days.

(21) Appl. No.: 15/596,560

(22) Filed: May 16, 2017

(65) Prior Publication Data
US 2018/0335523 A1 Nov. 22, 2018

(51) Int. Cl.
*G01S 19/24* (2010.01)
*G06F 1/14* (2006.01)
*B60R 16/023* (2006.01)

(52) U.S. Cl.
CPC ............. *G01S 19/24* (2013.01); *G06F 1/14* (2013.01); *B60R 16/023* (2013.01)

(58) Field of Classification Search
CPC ........ G01S 19/24; G01S 19/215; G01S 19/23; G06F 1/14
USPC ..................................................... 342/357.63
See application file for complete search history.

(56) References Cited

U.S. PATENT DOCUMENTS

| | | | | |
|---|---|---|---|---|
| 9,736,801 | B1* | 8/2017 | Lambert | ............... H04W 56/00 |
| 2004/0021601 | A1* | 2/2004 | Farmer | ................... G01S 19/23 |
| | | | | 342/357.62 |
| 2010/0073227 | A1* | 3/2010 | Waters | .................. G01S 19/235 |
| | | | | 342/357.48 |
| 2012/0050100 | A1* | 3/2012 | Huang | .................... G01S 19/34 |
| | | | | 342/357.31 |
| 2013/0235864 | A1* | 9/2013 | Do | .......................... G01S 5/021 |
| | | | | 370/350 |
| 2015/0154814 | A1* | 6/2015 | Kalinadhabhotla | .... G07C 5/008 |
| | | | | 701/31.5 |
| 2015/0296458 | A1* | 10/2015 | Abraham | .......... H04W 52/0225 |
| | | | | 370/311 |
| 2017/0280416 | A1* | 9/2017 | Zalewski | ................ G01S 19/46 |
| 2018/0025634 | A1* | 1/2018 | Ujiie | .................... G08G 1/0125 |
| | | | | 701/119 |

* cited by examiner

*Primary Examiner* — Harry K Liu
(74) *Attorney, Agent, or Firm* — Reising Ethington P.C.; David Willoughby

(57) ABSTRACT

A system and method of setting a clock at a vehicle, including: operating a vehicle clock installed in a vehicle; receiving an external time signal via wireless communications, wherein the external time signal is a wireless communications signal that includes a time value; determining whether a predetermined amount of time has passed since a most-recent clock update; when it is determined that a predetermined amount of time has passed since the most-recent vehicle clock update, then carrying out the following steps: (i) calculating a measured drift and a drift limit; (ii) determining whether the measured drift is less than the drift limit; and (iii) when it is determined that the measured drift is less than the drift limit, then setting the vehicle clock to the time value included in the received external time signal.

13 Claims, 2 Drawing Sheets

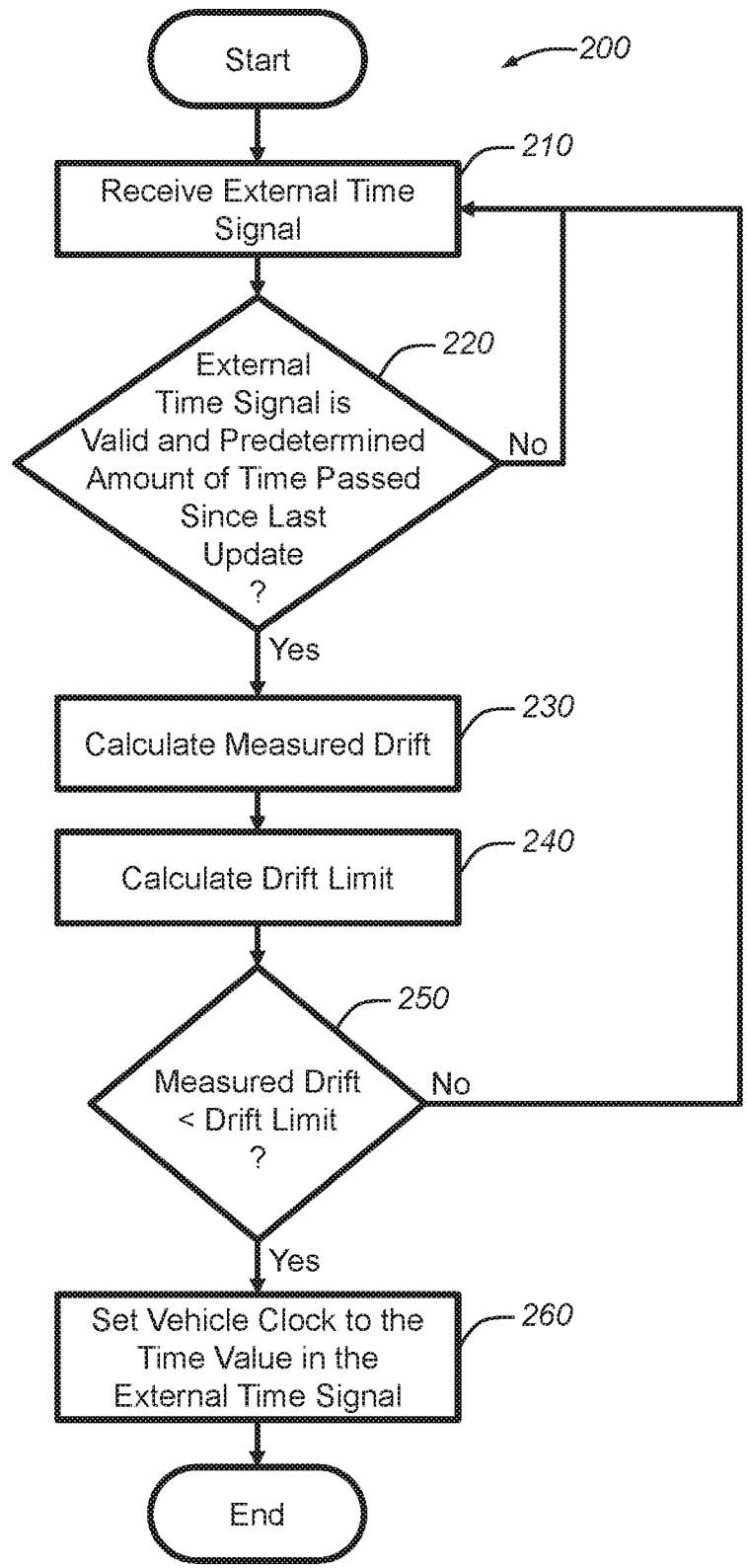

UPDATING VEHICLE CLOCK

INTRODUCTION

The disclosure relates to updating a vehicle clock based at least partially on a time value received at a vehicle.

Many electronic devices and/or systems include a real time clock that corresponds with the coordinated universal time (UTC). For example, many vehicles include a real time clock that can be used to provide or supplement a myriad of vehicle functionality, such as displaying a time to be viewed by a vehicle user. Additionally, the clock can be used to carry out vehicle functionality such as coordination of a vehicle sharing reservation. In such a scenario, a user may reserve a certain vehicle during certain times and, thus, the vehicle may enable the user to access the vehicle based on the reservation time and in accordance with the vehicle clock. Other uses of a vehicle clock will be recognized by those skilled in the art.

SUMMARY

According to a first embodiment, there is provided a method of setting a clock at a vehicle, including: operating a vehicle clock installed in a vehicle; receiving an external time signal via wireless communications, wherein the external time signal is a wireless communications signal that includes a time value; determining whether a predetermined amount of time has passed since a most-recent clock update; when it is determined that the predetermined amount of time has passed since the most-recent vehicle clock update, then carrying out the following steps (d1)-(d3): (d1) calculating a measured drift and a drift limit; (d2) determining whether the measured drift is less than the drift limit; and (d3) when it is determined that the measured drift is less than the drift limit, then setting the vehicle clock to the time value included in the received external time signal.

According to other embodiments, there is provided that the first embodiment further including any one or more of the following:
- the external time signal is received at a Global Navigation Satellite System (GNSS) module included in the vehicle and wherein the external time signal is a GNSS signal;
- the GNSS module sends the time value included in the GNSS signal to a vehicle system module via a controller area network (CAN) bus included in the vehicle electronics;
- the measured drift is based on the time value included in the received external time signal and on a present time according to the vehicle clock;
- the drift limit is based on a preset time period value and a drift factor, wherein the preset time period value is an amount of time over which a drift amount corresponding to the drift factor is tolerable by the vehicle, and wherein the preset time period value and the drift factor are stored in a memory device included in the vehicle electronics;
- the drift factor is further based on the vehicle clock last update time;
- the external time signal is received from a cellular carrier system or a device that is connected to a cellular carrier system;
- when it is determined that the measured drift is less than the drift limit, then updating the vehicle clock last update time to a present time according to the vehicle clock;
- the GNSS module sends the time value included in the GNSS signal to a vehicle system module via an in-vehicle wireless network;
- sending a notification to a remote facility when it is determined that the measured drift is not less than the drift limit;
- taking one or more security measures in response to determining that the measured drift is not less than the drift limit;
- the one or more security measures includes sending a notification to a user, an operator, an owner, or an administrator of the vehicle; and/or
- the setting of the vehicle clock is an initial setting of the vehicle clock, and wherein the operating step is carried out after the setting step.

According to a second embodiment, there is provided a method of setting a clock at a vehicle, the method including: storing a time drift factor in a non-volatile memory device included in vehicle electronics installed in the vehicle; incrementing a vehicle clock that comprises a processor included in the vehicle electronics installed in the vehicle; receiving an external time global positioning system (GPS) signal at a GPS module installed in the vehicle as part of the vehicle electronics, wherein the external time signal is a wireless communications signal that includes a time value, and wherein the GPS module is communicatively coupled to a communications bus included in the vehicle electronics; determining whether a predetermined amount of time has passed since a vehicle clock last update time, wherein the vehicle clock last update time represents the last time the vehicle clock was updated, and wherein the determination is made by a difference between a present time according to the vehicle clock and the vehicle clock last update time value; and when it is determined that the predetermined amount of time has passed since a vehicle clock last update time, then: recalling the time drift factor from a non-volatile memory device included in the vehicle electronics of the vehicle; calculating a measured drift, wherein the measured drift is based on a difference between a present vehicle time and the time value in the external time signal; calculating a drift limit, wherein the drift limit is based on the stored time drift factor and any one or more of the following: the present vehicle time, the vehicle clock last update time value, and a preset drift time period; determining whether the measured drift is less than the drift limit; and when it is determined that the measured drift is less than the drift limit, then setting the vehicle clock to the time value included in the received external time signal.

BRIEF DESCRIPTION OF THE DRAWINGS

Exemplary embodiments will hereinafter be described in conjunction with the appended drawings, wherein like designations denote like elements, and wherein:

FIG. 2 is a flowchart illustrating a method of setting a clock at a vehicle.

DETAILED DESCRIPTION

Figure 1:
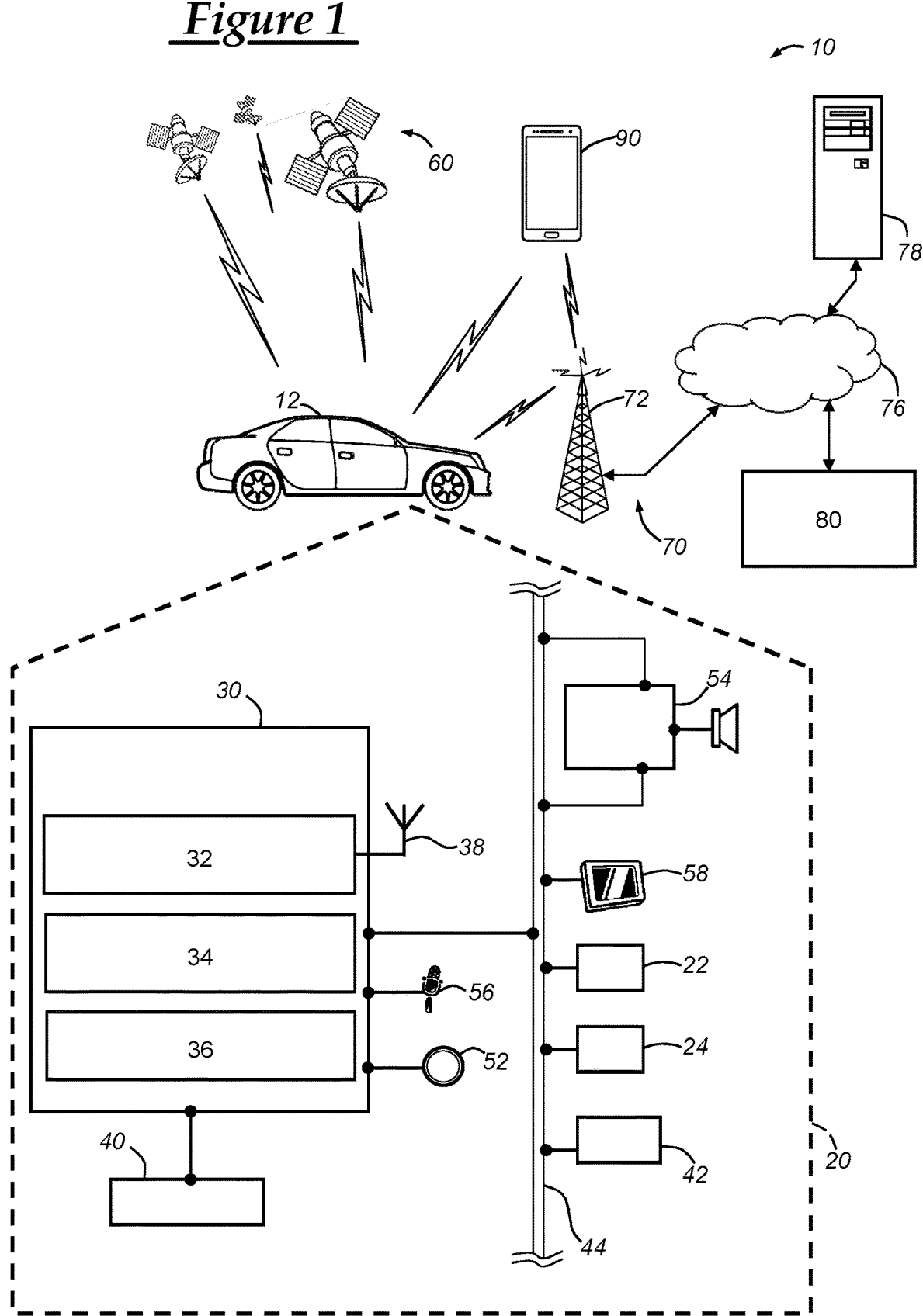
FIG. 1 is a block diagram depicting an embodiment of a communications system that is capable of utilizing the method disclosed herein.

The system and methods below enable a vehicle to automatically and securely update or set a clock from a wirelessly-received time signal. The method generally includes the steps of: receiving an external time signal, such as a global positioning system (GPS) signal that includes a time value, and, if a certain time has passed since the clock was last updated, then calculating a measured drift of the clock and a drift limit; and, when it is determined that the measured drift is less than the drift limit, then setting the clock according to a time indicted in the external time signal (e.g., the GPS time value).

A vehicle clock can provide various time-sensitive features or functions to a vehicle user, some of which may be vulnerable to malicious exploits. A malicious time attack may be used to manipulate the vehicle clock such that a security measure is disabled or the extent of the security is reduced thereby increasing the vehicle's vulnerability to malicious operation. For example, a spoofed wireless signal carrying a time value (e.g., a spoofed GPS signal) may be generated at or near the vehicle with the intention that the vehicle will receive the signal and update the vehicle clock according to the spoofed time value. In one embodiment, the vehicle clock is updated only when the received external time signal is close to that of the clock, and this can be done, for example, by updating the clock only when a calculated drift value is not less than a difference between a received time (e.g., a GPS signal) and the present time according to vehicle clock. In such an embodiment, even if the vehicle updates the clock to use a time value included in a spoofed signal, the clock would only be varied by a minimal amount (i.e., at most, equal to the magnitude of the drift limit), which may thereby reduce the extent of any malicious operation.

Referring now to FIG. 1, there is shown an operating environment that comprises a communications system 10 that can be used to implement the method disclosed herein. Communications system 10 generally includes a vehicle 12 with a GPS module 22 and a clock 40, a constellation of satellites 60, one or more wireless carrier systems 70, a land communications network 76, a computer 78, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 and/or to computer 78. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber-optic or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; a network time protocol (NTP) or a precision time protocol (PTP) server or system; or a third party repository to or from which vehicle data or other information is provided, whether by communicating with the vehicle 12, remote facility 80, or both. A computer 78 can also be used for providing Internet connectivity such as domain name system (DNS) services or as a network address server that uses dynamic host configuration protocol (DHCP) or other suitable protocol to assign an internet protocol (IP) address to the vehicle 12.

In one embodiment, computers 78 may be a set of servers that host network time protocol (NTP) or precision time protocol (PTP) (IEEE 1588) software or applications. In one example, a client device, such as wireless communications device 30 in vehicle 12, may send a time synchronization request message to NTP server 78. In response to the time synchronization request message, NTP server 78 may send one or more response messages that includes a synchronized time value to the device 30 such that a clock at device 30 may be synchronized with a universal time (e.g., UTC) that is known to the NTP server 78. The communications between the server 78 and device 30 may use user datagram protocol (UDP), transmission control protocol (TCP), internet protocol (IP), or any combination thereof (e.g., TCP/IP).

Remote facility 80 may be designed to provide the vehicle electronics 20 and mobile device 90 with a number of different system back-end functions. For example, remote facility 80 may be used in part to implement a car sharing service. In such a case, remote facility 80 may coordinate registrations of vehicles, store data pertaining to the registrations or other aspects of the car sharing service, and/or provide authentication and authorization data to SRWC devices, users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes the wireless communications device 30, a vehicle clock 40, a GPS module 22, engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, all of which are installed in the vehicle as an integral part thereof. The installed VSMs are physically integrated into the vehicle as OEM-installed components, although some may be installed as aftermarket components. The installed VSMs have power and/or data connections with other portions of the vehicle electronics that are either hardwired or provided wirelessly. Examples of the VSMs include the GPS module 22, engine control unit (ECU) 24, wireless communications device 30, and vehicle user interfaces 52-58, as will be described in detail below. The vehicle 12 can also include other VSMs 42 in the form of electronic hardware components that are located throughout the vehicle and which may receive input from one or more sensors and use the sensed input to perform diagnostic, monitoring, control, reporting, and/or other functions. For example, other VSMs may include a telematics unit, body control module (BCM), a center stack module (CSM), an infotainment unit, a powertrain control module, or a transmission control unit. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Engine control unit (ECU) 24 may control various aspects of engine operation such as fuel ignition and ignition timing. ECU 24 is connected to communications bus 44 and may receive operation instructions from a BCM (not shown) or other vehicle system modules, such as wireless communications device 30 or VSMs 42. In one scenario, the ECU 24 may receive a command from the BCM to start the vehicle— i.e., initiate the vehicle ignition or other primary propulsion system (e.g., a battery powered motor). In another scenario, the ECU 24 may be provided a signal from the wireless communications device 30 or the BCM that directs the ECU 24 to not perform any operations or at least to not start the vehicle's engine or primary propulsion system. This signal may be sent by device 30 or the BCM in response to receiving a remote vehicle disable (RVD) command from a computer 78 or remote facility 80. In response to detecting an attack or potential attack (e.g., an attempt to set time outside the drift limit), the remote vehicle disable function could be set to protect the vehicle against potential theft or malicious operation. This attack (e.g., invalid time set request) could also be communicated to other vehicle modules for their consideration, which may result in these vehicle modules reevaluating their trust of the module that is providing time information.

Wireless communications device 30 is capable of communicating data via short range wireless communications (SRWC). As shown in the exemplary embodiment of FIG. 1, wireless communications device 30 includes a wireless access point 32, a processor 34, memory 36, and one or more antennas 38 (only one is shown). In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short range wireless communications (SRWC) such as any of the IEEE 802.11 protocols, Wi-Fi™, WiMAX™, ZigBee™, Wi-Fi direct™, Bluetooth™, Bluetooth Low Energy™ (BLE), or near field communication (NFC). The SRWC chipset 32 enables the wireless communications device 30 to transmit and receive SRWC, such as BLE. The SRWC chipset may allow the device 30 to connect to another SRWC device. As used herein, a short range wireless communications (SRWC) device is a device capable of SRWC and may include a SRWC chipset. Additionally, in some embodiments, the wireless communications device may contain a cellular chipset thereby allowing the device to communicate via one or more cellular protocols, such as those used by cellular carrier system 70.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system (or primary mover) of the vehicle is not powered on. The operation or state of the wireless communications device 30 may be controlled by another vehicle system module, such as by the BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

In addition to acting as a wireless access point (WAP) for devices to connect to, wireless communications device 30 may carry out wireless communications with another wireless access point, such as a non-vehicle wireless access point (WAP). In such an arrangement, the non-vehicle WAP may be connected to a router and provide device 30 a connection to the Internet or other remote network, such as via land network 76. Device 30 may be set to a station or a client mode and, thus, may then carry out wireless communications with the non-vehicle WAP. As used herein, a station or a client mode is an operating mode of a wireless communications device that enables the device to act as a station or client device thereby allowing the device to scan for and connect to host devices (e.g., wireless access points). More particularly, in the client mode, the client device permits another device (e.g., a server device) to control communication protocols, etc. The non-vehicle WAP may be set to a wireless access point mode and provide a hotspot for device 30 to connect to when operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™ and that any SRWC, such as those listed above, may be used.

Wireless communications device 30 can provide an in-vehicle wireless network, which is a wireless network in which device 30 communicates with one or more other vehicle system modules or components via wireless communications. For example, any one or more of the VSMs or components discussed as part of vehicle electronics 20 can include a wireless network interface card that can then be used to communicate information with wireless communication device 30. In one embodiment, GNSS module 22 can send information to device 30 via wireless communications.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP or UDP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application (e.g., computer program) that enables the processor 34 to implement the vehicle clock. That or a different program may be used to carry out the method of FIG. 2 described below. Memory 36 may include RAM, other temporary powered memory, any non-transitory computer-readable medium (e.g., NVRAM or EEPROM), or any other electronic computer medium that stores some or all of the software needed to carry out the various external device functions discussed herein.

Global Navigation Satellite System (GNSS) or global position system (GPS) module 22 receives radio signals from a constellation of GPS satellites 60. These radio signals may include a time value of the current time, according to Coordinated Universal Time (UTC) or a local time clock. In the case where the time value is in UTC form, the vehicle electronics (e.g., GPS module 22 or processor 34) may convert the time value to a local value. In certain embodiments, the time value in the GPS signals may be more reliable than the vehicle clock and may be used to update the vehicle clock or other device. Also, from these signals, the module 22 can determine vehicle position which may enable the vehicle to determine whether it is at a known location, such as whether the vehicle is within a particular time-zone or whether the vehicle is at a particular location (e.g., a home or workplace). Moreover, GPS module 22 can provide this location data to wireless communications device 30, which can then use this data to identify known locations, such as a vehicle operator's home or workplace, as well as to carry out the method described herein. Additionally, GPS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GPS module 22 from the remote facility 80 via a vehicle telematics unit. In other embodiments, other global navigation satellite systems (GNSS) may be used in place or in conjunction with GPS and, in such an embodiment, vehicle electronics 20 may include a GNSS module, and system 10 may include a constellation of GNSS satellites that emits signals that can be received by the GNSS module. Other satellite navigation systems may be used as well.

The vehicle clock may be implemented in any suitable manner. In the illustrated embodiment, vehicle clock 40 is shown as being a separate module electrically coupled to wireless communications device 30. However, it may be incorporated into the wireless communication device 30 or some other VSM, or could be a separate VSM connected to the communications bus 44. Where implemented as a separate module, it may be run from full-time vehicle power originating at a main vehicle battery or fuel cell (not shown); or, it may include a dedicated lithium or other battery such as are used as CMOS batteries in electronics to power Real Time Clocks (RTCs). The clock operation may be carried out as part of a module's operating system, with the software implementing the methods described herein as a part of the operating system or as a separate software module or application. Alternatively, the clock 40 may be a separate component or circuit included on a circuit board that is attached to or in communication with wireless communication device 30 or other VSM 42.

For purposes of describing the method of FIG. 2 and the illustrated embodiment, the operation of the vehicle clock will be described as it would be implemented in wireless communication device 30 using processor 34 and programming stored in memory 36. Operation of the clock could therefore comprise incrementing a counter or clock time that is stored in a register or other memory such as memory 36. During vehicle manufacture or thereafter, a time drift factor may be stored in a memory device of the vehicle, such as memory 36. The time drift factor may be a numerical value that represents the amount of allowable drift over the course of a period of time (e.g., 12 hours, 24 hours), and it can be used to derive or calculate a drift limit. The time drift factor may remain constant for the life of the vehicle or may be updated during a visit to a service facility or via over-the-air (OTA) updates that can be received by vehicle 12 from a remote facility 80. The time drift factor may also be a variable value that is computed based on ambient temperature, humidity, barometric pressure, supply voltage, the age of the crystal (e.g., in the case of the vehicle clock including a crystal oscillator), and other factors as can be appreciated by those skilled in the art. Memory 36, or other memory device in vehicle electronics 20, may store a vehicle clock last update time value that identifies the most-recent time (i.e., the last time) the vehicle clock 40 was updated. The vehicle clock last update time value may be a time value (e.g., a timestamp) and may be set or updated whenever the vehicle clock 40 is set to an external time value, such as a time value received from a GPS radio signal, from a NTP server, or other wireless or wired means.

As mentioned above, clock 40 may reside in a memory device of vehicle electronics 20, such as memory 36. In such an embodiment, the time may be loaded using a secure boot loader, which can be a program that loads an operating system of a certain electronic computing device located in vehicle electronics 20, such as wireless communication device 30. The boot loader may be secure in that the boot loader only executes code or instructions that are signed or authenticated. Such signature or authentication portion may be a certificate and may exist as part of the code to be executed by the secure boot loader. In some embodiments, the initialization of the vehicle can be dependent on a secure boot loader that verifies and accepts the external time signal based on the external source. For example, if the external time signal is determined to be generated or derived from GNSS signals, then the boot loader may use the external time signal to derive a time value; otherwise, the boot loader may disregard the external time signal.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Vehicle 12 can also communicate wirelessly, via short range wireless communication (SRWC) such as the IEEE 802.11 or Bluetooth Low Energy™ protocols mentioned above, with mobile device 90 or a passive entry technology keyfob or other key, referred to herein as a passive entry key (PEK) (not shown). The PEK may comprise a body that includes one or more switches or buttons for user interaction; further, the body may carry a processor, memory, and a wireless transmitter for the SRWC. As will be appreciated by those skilled in the art, the PEK memory may store and transmit a cryptographic key used for PEK validation at the vehicle. Some functions of the PEK with the vehicle 12 may be passive (e.g., not requiring manual input by the user) such as enabling unlocking of the vehicle doors when the PEK is in the proximity of the vehicle, while other functions may require active input, such as a button press on the PEK to, for example, unlatch a trunk of the vehicle. In any event, transmission of a wireless signal that includes the cryptographic key may initiate or control one or more of the vehicle functions such as locking and unlocking doors, starting the vehicle, operating a vehicle alarm system, operating a vehicle trunk release, etc.

The mobile device 90 is a SRWC device and may include: hardware, software, and/or firmware enabling cellular telecommunications and SRWC as well as other mobile device applications. The hardware of the mobile device 90 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle, some of which are listed above. Another implementation may enable the user to make a reservation to use a vehicle that is a part of a car sharing service. Additionally, the application may also allow the user to connect with the remote facility 80 or call center advisors at any time. In another embodiment, the mobile device 90 may send a time value to the vehicle and, after receiving the time value, the vehicle may update the vehicle clock according to the received time value. The mobile device 90 may receive the time value from a remote facility 80 or computer 78, which may be a NTP or PTP server, or from a cellular carrier system 70.

In some embodiments, mobile device 90 may be able to act as a passive entry key, such as the PEK described above. For example, as discussed above, the mobile device may be provided a key or other information that authorizes the device to access the vehicle. Such a scenario may be implemented in conjunction with a car sharing service whereby a remote facility coordinates car rentals or ride sharing, such as remote facility 80. The remote facility may generate and issue a virtual key (e.g., a string or array of bits) to the mobile device 90 and to the vehicle 12. The mobile device 90 may then securely pass the virtual key to the vehicle (e.g., via an established SRWC connection) and the vehicle may then determine if the virtual key is authorized to access the vehicle and/or the level of access the virtual key provides or is associated with (e.g., full vehicle functionality, only unlocking/locking features). The application may enable such virtual key management and functionality. As will be discussed in more detail below, once the vehicle authenticates and/or authorizes the virtual key (or the mobile device or the user of the mobile device), the vehicle may automatically carry out one or more vehicle functions or may receive one or more commands from the mobile device, wherein the one or more commands instruct the vehicle to perform one or more vehicle functions or a suite of functions, as will be discussed more below.

With reference to FIG. 2, there is shown an embodiment of a method 200 of setting a clock at a vehicle. In some embodiments, the method 200 may be carried out in part or in whole by the wireless communications device 30. Method 200 can be used in various scenarios as to avoid intolerable clock drift and/or malicious time attacks. As mentioned above, clock 40 may experience inevitable time drift and, to address any time drift, the clock may use an external time source to update to the correct time. The external time source can be any device, component, module, or system that can provide the clock 40 with a present time value representing the present time (or a value that can be used to derive the present time). Examples of an external time source can be GPS satellites that provide the GPS module 22 with GPS signals that contain a time value, an NTP or PTP server 78 that can use land network 76 and cellular carrier system 70 to provide the vehicle electronics 20 with a present time value, or mobile device 90 that can provide vehicle 12 a present time value via SRWC.

Malicious persons may realize the use of external time signals for updating a vehicle's clock and may attempt to spoof an external time source, such as spoofing GPS signals using a GPS spoofing device. Such spoofing may attempt to change the vehicle clock by a spoofed time difference. Wireless signal spoofing may be performed through various mechanisms or strategies, such as meaconing, which is the interception and rebroadcasting of navigation signals. The spoofed time difference is the difference in time between the vehicle clock and the spoofed time value presented in the spoof signal. In many scenarios, when a malicious person attempts to spoof the vehicle clock, the malicious person desires to modify the vehicle clock by a significant amount of time compared to a typical amount of time drift (i.e., the amount of time the clock has drifted or deviated from the actual time, which may be measured daily). Therefore, in some embodiments, method 200 can be used to prevent such malicious attacks while still allowing the clock to be updated as to avoid unwanted (or intolerable) time drift that might otherwise accumulate to a more significant amount over time. In one embodiment, the method 200 operates under an assumption that any time difference that is less than a drift limit is insignificant to vehicle operation (i.e., a tolerable time drift) and, thus, even malicious spoofed time values with small spoofed time differences (i.e., those values under the drift limit) are inconsequential.

In the illustrated embodiment, prior to method 200, the clock is operated as a part of normal vehicle functions, and this may be done using processor 34 to periodically increment a present time value of the clock. Method 200 begins with step 210 wherein an external time signal is received from an external time source. In some embodiments, a global positioning system (GPS) signal is received at a GPS module 22 from a constellation of GPS satellites 60. Those skilled in the art will recognize that any global navigation satellite system (GNSS) may be used in place or in conjunction with GPS. The GPS module 22 may output GPS data onto the CAN bus 44 that includes a time value portion and a geographical value portion. In one example, the outputted data may be formatted according to National Marine Electronics Association (NMEA) standards. The time value portion includes a time value, such as a timestamp, and the geographical value portion includes geographical values, such as longitudinal and latitudinal values. Once the vehicle receives the external time signal, the signal may be sent to another vehicle system module. In one embodiment, the GPS module 22 may receive a GPS signal that may then be sent to the processor 34 of the wireless communications device 30 via CAN bus 44. Once the external time signal is received at processor 34, the vehicle may use memory 36 to store the signal and/or processor 34 to parse the signal or otherwise process the signal, such as determining whether the signals is valid (see step 220).

In one embodiment, when the external time signal is received from the external time source, an external signal received time may be obtained from clock 40 and saved into memory 36, or other memory device. The external signal received time is a time according to the vehicle clock when the external time signal is received. The method 200 continues to step 220.

In step 220, the vehicle can determine whether the external time signal received is valid and whether a predetermined amount of time has passed since the most recent clock update, which may be represented by a vehicle clock update time that specifies the last time the vehicle clock was updated. In some embodiments, a signal that is in a proper or anticipated format when received (e.g., at the GPS module, or other module that receives the external time signal) may be taken to be a valid external time signal.

In one embodiment, the vehicle may use one or more bits or bytes included in the external time signal to validate, verify, authenticate, or authorize the signal or contents included in the signal. For example, upon receiving the GPS signal at GPS module 22 from a constellation of satellites 60, the GPS module 22 may then send a derivative message to the wireless communications device 30, wherein the derivative message is a message generated by GPS module 22 that is derived at least in part from the external time signal. The derivative message may include a bit or byte indicating a validity of the message as determined by the GPS module. In one example, the GPS module 22 or other VSM 42 may use traditional receiver autonomous integrity monitoring (RAIM) or other spoofing mitigation techniques that are known by those skilled in the art. The GPS module may employ anti-spoofing means, such as those known in the art. Upon determining that the signal is invalid, or that the signal is likely to be invalid, the method may continue back to step 210.

In addition to determining whether the external time signal is valid, it is determined whether a predetermined amount of time (i.e., a clock update period) has passed since a vehicle clock last update time. The clock update period can be preset during an initialization process of vehicle 12 and may be occasionally updated by a remote facility or server, such as remote facility 80 or computers 78. In one example, the clock update period can be 12 hours, such that a difference between the vehicle clock last update time value and the present vehicle clock time of greater than or equal to 12 hours means that the predetermined amount of time has passed, and the method 200 therefore proceeds to step 230; otherwise, the method 200 returns to step 210. In some embodiments, only one of these determinations may be made (e.g., only determining whether the external time signal is valid, or only determining whether a predetermined amount of time has passed since a vehicle clock last update time).

In step 230, a measured drift is calculated and, in some embodiments, the measured drift can be based on a difference between a present vehicle time and the time value in the external time signal. The measured drift may be a value that represents a variance in a time received from an external source, such as the external time signal, and a time of the vehicle clock. In one embodiment, the measured drift can be determined by calculating an absolute difference between the external time value and a present time of the vehicle clock. For example, if the external time value is 12:01: 01.020 (i.e., 12:01 and 1.02 seconds) and the present time value according to clock 40 is 12:01:02.300 (i.e., 12:01 and 2.3 seconds), then the measured drift would be 1.28 seconds (the absolute value of 12:01 and 1.02 seconds minus 12:01 and 2.3 seconds). In one embodiment, the present time of the vehicle clock can be a time when the external vehicle signal was received, a time when the measured drift is to be calculated, or any time therebetween. The method 200 proceeds to step 240.

In step 240, a drift limit is calculated and, in some embodiments, the drift limit can be based on the stored time drift factor and any one or more of the following: the present vehicle time, the vehicle clock last update time value, and a preset drift time period. In one embodiment, the drift limit can be calculated as being equal to:

$$((\text{Present Time}-\text{Last Update Time})/\text{Time Period})*\text{Time Drift Factor}$$

The "Present Time" can be a present time according to the vehicle clock 40, the "Last Update Time" can be a vehicle clock last update time value representing when the most recent clock update occurred. The "Time Period" can be a predetermined time period (e.g., 12 hours, 24 hours) that represents a time period over which a variance of less than the time drift factor is permitted (i.e., a drift amount that is tolerated for each "Time Period"), and the "Time Drift Factor" can be the time drift factor, as discussed above. In this embodiment, the drift limit takes into consideration the time since the clock was last updated ("Present Time" minus "Last Update Time") and an amount of drift that is tolerable ("Time Drift Factor"), which is then normalized according to a predetermined time period ("Time Period"). In other embodiments, the time drift factor can be calculated based on a predetermined "Time Period" and, in such an embodiment, there may not be a need to store a separate "Time Period" value. As an example, the time drift factor may be in the range of 1 to 5 seconds for a Time Period of 24 hours.

As discussed above, the measured drift and/or the drift limit can be based on various values, including a present vehicle time, a time value included in an external time signal, an external signal received time, a time since the external time signal was received, a vehicle clock last update time, a time drift factor, and other constant numerical values. Any one or more of these times or values can be stored in memory 36 or other memory device included in vehicle electronics and, upon the occurrence of step 230 or 240, these values may be recalled from memory, which may be a non-volatile memory device that is included in the vehicle electronics, as discussed above. Steps 230 and 240 may be carried out at the same time or step 240 may be carried out before step 230. The method 200 proceeds to step 250.

In step 250, it is determined whether the measured drift is less than the drift limit. This step can be carried out by processor 34 and, in one embodiment, the measured drift and the drift limit are calculated by processor 34 using the drift factor and/or other data retrieved from memory 36. The measured drift and drift limit can then be compared by processor 34. In another embodiment, other portions of the vehicle electronics may determine if the measured drift is less than or equal to the drift limit.

After determining whether the measured drift is less than the drift limit, a notification, status message, or other message may be sent to a remote facility or another vehicle module. In one embodiment, a notification may be sent to remote facility 80 (or VSM 42) that indicates that the time was successfully updated. In another embodiment, when the measured drift is not less than the drift limit, then a message or notification can be sent to remote facility 80 (or VSM 42) indicating that an external time signal was received, but that the measured drift is not less than the drift limit. In another embodiment, one or more other vehicle functions or security measures may be carried out in response to the determination of whether the measured drift is less than the drift limit, such as disabling one or more vehicle components when the measured drift is not less than the drift limit. Other such security measures may include disabling one or more vehicle components; enabling or activating one or more security systems or alarms of the vehicle; informing a remote facility or system of a security concern; notifying a mobile device (e.g., a SRWC device or cellular device) of an owner, user, or operator of the vehicle; and/or any other vehicle security measures known to those skilled in the art. Any of these notifications or messages can include any of the information in the GPS signal (or other external time signal), including one or more status or error codes, some of which may correspond to one or more steps of determinations of the method 200. The method 200 continues to step 260 when the measured drift is less than the drift limit; otherwise the method 200 returns to step 210.

In step 260, after it has been determined that the measured drift is less than the drift limit, then the vehicle clock is set to the time value included in the received external time signal. The clock 40 can be updated by processor 34 or another VSM through clock 40 receiving a new time signal. The new time signal is a signal that includes a time value that the clock is to be set to. The new time signal can include a new time value that can be the time value that was included in the external time signal. In addition to setting the clock 40 to a new time value, the vehicle may set or update the vehicle clock last update time to the new time signal or to another time. Setting or updating vehicle clock last update time may include modifying a value stored in a non-volatile memory device, such as memory 36.

It should be appreciated that, when the measured drift is greater than or equal to the drift limit (step 250), then the external time signal will be ignored, at least for purposes of updating or setting the vehicle clock. This functionality exists, at least in some embodiments, to prevent the vehicle clock from being spoofed by an amount that is too large to tolerate (i.e., the drift limit). The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of setting a clock at a vehicle, the method comprising:
    (a) operating a vehicle clock installed in a vehicle;
    (b) receiving an external time signal via wireless communications, wherein the external time signal is a wireless communications signal that includes a time value;
    (c) determining whether a predetermined amount of time has passed since a most-recent clock update;
    (d) when it is determined that the predetermined amount of time has passed since the most-recent vehicle clock update, then carrying out the following steps (d1)-(d3):
        (d1) calculating a measured drift and determining a drift limit, wherein the drift limit is based on a preset time period value and a drift factor, wherein the preset time period value is an amount of time over which a drift amount corresponding to the drift factor is tolerable by the vehicle, and wherein the preset time period value and the drift factor are stored in a memory device included in the vehicle electronics;
        (d2) determining whether the measured drift is less than the drift limit; and
        (d3) when it is determined that the measured drift is less than the drift limit, then setting the vehicle clock to the time value included in the received external time signal.

2. The method of claim 1, wherein the external time signal is received at a Global Navigation Satellite System (GNSS) module included in the vehicle and wherein the external time signal is a GNSS signal.

3. The method of claim 2, wherein the GNSS module sends the time value included in the GNSS signal to a vehicle system module via a vehicle bus included in the vehicle electronics.

4. The method of claim 1, wherein the measured drift is based on the time value included in the received external time signal and on a present time according to the vehicle clock.

5. The method of claim 1, wherein the drift factor is further based on the vehicle clock last update time.

6. The method of claim 1, wherein the external time signal is received from a cellular carrier system or a device that is connected to a cellular carrier system.

7. The method of claim 1, wherein the most-recent vehicle clock update is stored in the vehicle as a vehicle clock last update time, and wherein step (d3) further comprises updating the vehicle clock last update time to a present time.

8. The method of claim 2, wherein the GNSS module sends the time value included in the GNSS signal to a vehicle system module via an in-vehicle wireless network.

9. The method of claim 1, further comprising the step of sending a notification to a remote facility when it is determined that the measured drift is not less than the drift limit.

10. The method of claim 1, further comprising the step of taking one or more security measures in response to determining that the measured drift is not less than the drift limit.

11. The method of claim 10, wherein the one or more security measures includes sending a notification to a user, an operator, an owner, or an administrator of the vehicle.

12. The method of claim 1, wherein the setting of the vehicle clock is an initial setting of the vehicle clock, and wherein the operating step is carried out after the setting step.

13. A method of setting a clock at a vehicle, the method comprising:
    storing a drift factor in a non-volatile memory device included in vehicle electronics installed in the vehicle;
    incrementing a vehicle clock that comprises a processor included in the vehicle electronics installed in the vehicle;
    receiving an external time global positioning system (GPS) signal at a GPS module installed in the vehicle as part of the vehicle electronics, wherein the external time signal is a wireless communications signal that includes a time value, and wherein the GPS module is communicatively coupled to a communications bus included in the vehicle electronics;

determining whether a predetermined amount of time has passed since a vehicle clock last update time, wherein the vehicle clock last update time represents the last time the vehicle clock was updated, and wherein the determination is made by a difference between a present time according to the vehicle clock and the vehicle clock last update time; and when it is determined that the predetermined amount of time has passed since a vehicle clock last update time, then:

recalling the drift factor from a non-volatile memory device included in the vehicle electronics of the vehicle;

calculating a measured drift, wherein the measured drift is based on a difference between a present vehicle time and the time value in the external time signal;

calculating a drift limit, wherein the drift limit is based on a preset time period value and the drift factor, wherein the preset time period value is an amount of time over which a drift amount corresponding to the drift factor is tolerable by the vehicle, and wherein the preset time period value and the drift factor are stored in the non-volatile memory device included in the vehicle electronics;

determining whether the measured drift is less than the drift limit; and when it is determined that the measured drift is less than the drift limit, then setting the vehicle clock to the time value included in the received external time signal.

* * * * *